(12) United States Patent
Braun et al.

(10) Patent No.: US 8,070,948 B2
(45) Date of Patent: Dec. 6, 2011

(54) METHOD OF PURIFYING WASTEWATER AND SEWAGE TREATMENT PLANT

(75) Inventors: Gerhard Braun, Saarbrücken (DE); Kay Gunther Gabriel, Dudweiler (DE)

(73) Assignee: ItN Nanovation AG (DE)

( * ) Notice: Subject to any disclaimer, the term of this patent is extended or adjusted under 35 U.S.C. 154(b) by 601 days.

(21) Appl. No.: 12/279,644

(22) PCT Filed: Feb. 17, 2007

(86) PCT No.: PCT/EP2007/001382
§ 371 (c)(1),
(2), (4) Date: Dec. 18, 2008

(87) PCT Pub. No.: WO2007/093440
PCT Pub. Date: Aug. 23, 2007

(65) Prior Publication Data
US 2009/0314710 A1    Dec. 24, 2009

(30) Foreign Application Priority Data
Feb. 17, 2006    (DE) .......................... 10 2006 008 453

(51) Int. Cl.
*C02F 3/00* (2006.01)
(52) U.S. Cl. ......... 210/615; 210/616; 210/791; 210/797
(58) Field of Classification Search .......... 210/615–616, 210/791, 797
See application file for complete search history.

(56) References Cited

U.S. PATENT DOCUMENTS

| | | | |
|---|---|---|---|
| 5,458,779 A | 10/1995 | Odegaard | |
| 6,982,037 B2* | 1/2006 | Horng et al. | 210/615 |
| 2003/0132174 A1* | 7/2003 | Isomura et al. | 210/767 |
| 2006/0175256 A1* | 8/2006 | Masten et al. | 210/638 |

FOREIGN PATENT DOCUMENTS

| | | |
|---|---|---|
| DE | 196 23 592 C1 | 1/1998 |
| DE | 298 19 446 U1 | 5/1999 |
| DE | 198 07 890 A1 | 8/1999 |
| DE | 199 53 459 A1 | 5/2001 |
| DE | 101 27 554 A1 | 12/2002 |
| DE | 203 15 451 U1 | 2/2004 |
| DE | 20 2004 010 485 U1 | 12/2004 |
| EP | 1 034 835 A1 | 9/2000 |
| EP | 1 382 377 A1 | 1/2004 |
| EP | 1 484 287 A1 | 12/2004 |
| JP | 63-214177 | 9/1988 |
| JP | 4-176327 | 6/1992 |
| JP | 2001-233681 | 8/2001 |
| WO | 91/11396 | 8/1991 |

* cited by examiner

Primary Examiner — Chester Barry
(74) Attorney, Agent, or Firm — DLA Piper LLP (US)

(57) ABSTRACT

A description is given of a sewage treatment plant, in particular a small sewage treatment plant, having at least one activation tank for wastewater and/or having at least one secondary clarification tank for wastewater, wherein the activation tank and/or the secondary clarification tank are charged with shaped bodies which are freely floating in the wastewater, which is distinguished in that it has at least one filtration appliance for wastewater purification, which filtration appliance comprises at least one ceramic-based membrane for separating off microorganisms. In addition a method of purifying wastewater is described, comprising a biological purification of the wastewater by microorganisms in at least one activation tank and/or comprising a secondary clarification of the wastewater in at least one clarification tank, wherein the at least one activation tank and/or the at least one secondary clarification tank, for cleaning, is charged with shaped bodies, characterized in that the microorganisms situated in the wastewater are separated off by means of at least one ceramic-based membrane.

27 Claims, 3 Drawing Sheets

METHOD OF PURIFYING WASTEWATER AND SEWAGE TREATMENT PLANT

RELATED APPLICATION

This is a §371 of International Application No. PCT/EP2007/001382, with an international filing date of Feb. 17, 2007 (WO 2007/093440 A1, published Aug. 23, 2007), which is based on German Patent Application No. 102006008453.5, filed Feb. 17, 2006.

TECHNICAL FIELD

This disclosure relates to sewage treatment plants for wastewater purification, having a filtration device, and to methods of purifying wastewater, in particular wastewater in a sewage treatment plant.

In addition to screens and settling tanks which, in a first step, free wastewaters from coarse components, conventional sewage treatment plants also contain an activation tank and a secondary clarification tank. In the activation tank, microorganisms are used in order to decompose fecal matter or other organic substances. The microorganisms used are separated off again by sedimentation from the wastewater subsequently to the activation tank, in the secondary clarification tank and in part recirculated to the activation tank. Complete separation of the microorganisms is not possible by a sedimentation process, and therefore microorganisms which are harmful to health can sometimes pass into the environment together with the wastewater. European union directives for keeping water bodies clean, which guidelines have already been substantially converted to national legislation, however, prescribe on a Europe-wide basis that only biologically clarified wastewater which is essentially free from microorganisms may be allowed to drain off into the environment. The microorganisms are generally separated off by fine filters which reliably separate off microorganisms.

In Germany, primarily in rural areas, in particular in eastern Germany, predominantly for technical or economic reasons, currently an estimated 5.3 million people are not connected to the municipal wastewater grid. Those affected, as a consequence of said EU directives, had to be provided with facilities by Dec. 31, 2005 either by connection to the municipal grid or by the operation of a small sewage treatment plant. This situation created a high demand for decentralized wastewater treatment plants which is maintained to date.

Small sewage treatment plants are relatively widely distributed, which sewage treatment plants consist of a round concrete container which again is subdivided into three chambers (preliminary clarification/activation tank/secondary clarification). The preliminary clarification is used in order first to remove coarse components from the wastewater mechanically or by simple sedimentation. The coarse components which are separated off must be pumped off at regular time intervals. The activation tank contains microorganisms which perform the biological purification, the secondary clarification tank serves for separating off the microorganisms which have been introduced and their recirculation to the activation tank and/or to the preliminary clarification tank. This equipment can be supplemented, for example, by a compressor which feeds oxygen to the activation tank via a membrane tube aerator, and also a submersible motor pump for transporting the excess sludge.

In an activation tank, in the course of time, excess clarified sludge forms which must be regularly drawn off by suction. Alternatively, what are termed moving-bed processes are also known in which the amount of excess sludge is generally drastically reduced. In contrast to the classical activation tank, in moving-bed processes, free-floating plastic bodies are employed which can fill up the activation tank virtually completely. Microorganisms are found in this case both on the plastic bodies and also freely suspended in the water.

In recent years, as a further development of the known moving-bed methods, increasingly what are known as WSB® methods (fluidized bed-moving bed-biofilm methods) have been able to become established. Such methods are described, for example, in DE 10127554 and also in DE 196 23 592. In these methods also, plastic bodies serve as carriers which can be colonized by the microorganisms. The microorganisms in WSB® methods are however generally localized virtually completely on the carrier material. Whereas in fluidized-bed methods operations were originally carried out exclusively anaerobically (without aeration), in WSB® methods, as a result of the introduction of air, the plastic carriers colonized by microorganisms are optimally and uniformly distributed (or "fluidized") in the activated zone and are situated in the moving suspension, which gave rise to the name Wirbel-Schwebe-Bett (WSB®) [fluidized bed-moving bed]. Even in the case of greatly varying inflow, e.g. in the holiday period, the biological system in the activation tank always remains intact.

However, there is also the problem in the case of wastewater purification by a WSB® method that microorganisms are discharged into the environment, that is to say microbe-containing wastewater is introduced into the activated soil zone or into a receiving body of water.

To avoid harmful microorganisms from being introduced into the activated soil zone and/or to enable treated wastewater to be able to be reused as service water, the wastewater must therefore be additionally filtered.

For instance, DE 19807890 describes a sewage treatment plant, the wastewater of which is filtered through submerged microfiltration membranes in order to pass it thereafter into a service water reservoir and reuse it. DE 20315451 describes a microfiltration device as a retrofitting set for a small sewage treatment plant which is connected downstream of the activation tank but upstream of the actual outlet of the sewage treatment plant.

In all cases here organic filter membranes are used which are arranged in a module form. However, organic filter membranes have the disadvantage that they can only be regenerated or chemically cleaned inadequately, so that all of these membranes must generally be renewed in relatively short time periods (<1 year). In addition, organic membranes have only a restricted mechanical stability, such that at relatively high liquid pressures, they can easily be damaged. The use of organic membranes becomes particularly serious in the abovementioned moving-bed methods, in particular in the WSB® method, since in these, as a result of the plastic carrier particles which can move freely in the activation tank, mechanical defects on the organic membrane can be caused as a result of which the low-stability organic filter membranes can be destroyed within a short time.

The use of filter membranes is in addition linked with the fundamental problem that during filtration, a covering layer is deposited on the outer surface of the membrane (what is termed fouling) which provides a resistance to the material to be filtered. This leads to a drastic reduction in filter performance to total blockage and therefore to total loss of the filter membrane.

Detachment of this covering layer on the membrane requires regular cleaning. In this operation the permeate stream is reversed so that the previously filtered water is then pumped back through the filter membrane in the opposite direction (backwashing). As a result, the covering layer is at least in part detached, as a result of which the efficiency of the filter performance is increased again for a certain time. However, this procedure generally requires separate equipment. In addition, cleaning is at the cost of losing already filtered water which greatly reduces the efficiency of the overall system.

It could therefore be helpful to provide a simple and inexpensive solution for purifying wastewaters. In particular, it could be helpful to separating off microorganisms contained in wastewaters. Known prior art problems such as said destruction of filter membranes by biological or mechanical action or the blockage of membranes and resultant complex cleaning steps should be avoided as completely as possible.

SUMMARY

We provide a sewage treatment plant including at least one activation tank for wastewater and/or including at least one secondary clarification tank for wastewater, the activation tank and/or the secondary clarification tank being charged with shaped bodies which are freely suspended in the wastewater, wherein the sewage treatment plant has at least one filtration appliance for wastewater purification, which filtration appliance includes at least one ceramic-based membrane for separating off microorganisms.

We also provide a method of purifying wastewater, including biologically purifying the wastewater with microorganisms in at least one activation tank and/or secondarily clarifying the wastewater in at least one clarification tank, wherein the at least one activation tank and/or the at least one secondary clarification tank, for cleaning, is charged with shaped bodies such in that microorganisms situated in the wastewater are separated by at least one ceramic-based membrane.

BRIEF DESCRIPTION OF THE DRAWINGS

The above and other advantages will become apparent from the description of the following examples and figures. Individual features can be implemented each alone or in combination with one another. The examples and figures serve only for illustration and for better understanding and are in no way to be understood as being restrictive.

In the figures.

DETAILED DESCRIPTION

Figure 1:
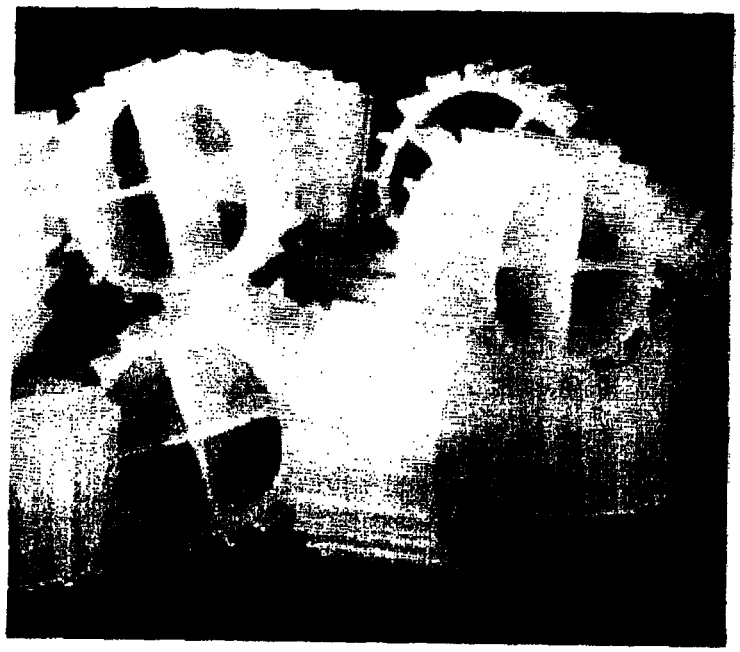
FIG. 1: shows shaped body preferably used "K1 Biofilm Carrier Elements" from Kaldness, 3103 Tønsberg, Norway

The sewage treatment plant is preferably a small sewage treatment plant, in particular having a purification output for 1 to 5000 persons (up to a resident figure of 5000).

Our sewage treatment plant has at least one activation tank for wastewater. In this the wastewater is biologically purified by microorganisms. Alternatively, or in addition, at least one secondary clarification tank for wastewater is provided.

In the sewage treatment plant, either the activation tank or the secondary clarification tank is charged with shaped bodies which are freely suspended in the wastewater. In a preferred aspect of the sewage treatment plant, both the activation tank and the secondary clarification tank are charged with shaped bodies which are freely suspended in the wastewater.

Finally, the sewage treatment plant has at least one filtration appliance for wastewater purification, which filtration appliance comprises at least one ceramic-based membrane for separating off microorganisms.

A filtration device can be connected not only directly to an activation tank but also to a secondary clarification tank.

The shaped bodies are preferably shaped bodies based on plastic, in particular based on polyethylene.

Particularly preferred shaped bodies for the activation tank are those which are suitable as carriers for microorganisms (suitable shaped bodies are described, for example, in EP 685432). In such a preferred embodiment, the sewage treatment plant according to the invention operates, in particular, according to the abovementioned WSB® method.

In further aspects of the sewage treatment plant, it can also be preferred to use shaped bodies in the activation tank which are not suitable as carriers for microorganisms.

Shaped bodies which are unsuitable as carriers for microorganisms are preferred, in particular, for the secondary clarification tank. In particularly preferred embodiments, shaped bodies can even have biocidal properties in the secondary clarification tank. This has the advantage that it is made more difficult for microorganisms to colonize the secondary clarification tank.

A filtration appliance which is connected to an activation tank is, in a sewage treatment plant, preferably arranged in such a manner that the surface of the at least one membrane of the filtration appliance can come into direct contact with the shaped bodies which are suspended in the activation tank. For this the at least one membrane of the at least one filtration appliance is immersed at least in part, preferably completely, in the activation tank.

In operation, in this arrangement, the shaped bodies which are situated in the activation tank can continuously impact the surface of the at least one membrane. This means that a covering layer of microorganisms which forms on the membrane surface is mechanically detached by the impacts, or its formation is greatly delayed. Frequent cleaning of the membrane by the backwashing mentioned at the outset is thereby successfully avoided with particular advantage. The efficiency of a sewage treatment plant is correspondingly greatly increased.

Such an arrangement is also preferred for a filtration appliance which is connected to a secondary clarification tank. The at least one membrane of the at least one filtration appliance is also in this case preferably at least in part, more preferably completely, immersed in the secondary clarification tank, in such a manner that the shaped bodies which are situated in the secondary clarification tank can, in operation, impact the surface of the at least one membrane and thereby clean it or avoid it fouling or at least greatly delay it.

In a sewage treatment plant, preferably use is made of shaped bodies which have a maximum space diagonal between 0.1 cm and 10 cm, preferably between 0.5 cm and 5 cm, in particular between 0.5 cm and 2 cm.

In a particularly advantageous structure, a sewage treatment plant has at least one filtration appliance having membrane plates arranged in parallel to one another. The distance between 2 adjacent membrane plates corresponds in this case to at least the maximum space diagonal of the shaped bodies. Preferably, the distance exceeds the maximum space diagonal of the shaped bodies by at least 5%, preferably by at least 25%, in particular by at least 100%.

This measure enables the shaped bodies in the activation tank and/or in the secondary clarification tank to be able to slide between adjacent membranes plates and thus be able to come directly into contact with opposite surfaces of the adjacent membrane plates. The formation of a covering layer is at least greatly delayed on these surfaces, which has a equally beneficial effect on the efficiency of the sewage treatment plant and the frequency of necessary cleaning operations.

When the distance between the adjacent membrane plates is being set, 2 factors in particular play a part. Firstly, an attempt is made to set the distance between the membrane plates as small as possible in order to keep the filtration appliance as compact as possible. Secondly, the shaped bodies should in no event be clamped between the membrane plates, since otherwise a covering layer of microorganisms could form locally. The optimum distance in this case depends, in particular on the shape and size of the shaped bodies. For instance, for "K1 Biofilm Carrier Elements" shaped bodies (Kaldness, 3103 Tønsberg, Norway), for which a maximum space diagonal of 13.5 mm was determined, an optimum spacing of the membrane plates of 30 mm±0.5 mm was determined. The distance in this case exceeds the maximum space diagonal of the shaped bodies by more than 100%.

Preferably, a membrane of the filtration appliance is a membrane plate made of a porous ceramic. In principle, the shape of the membrane plate may be freely chosen. For instance, round or rectangular membrane plates may be preferred, matched to the respective individual case.

A ceramic-based membrane is distinguished by resistance to biological or chemical action and also by high mechanical stability. In contrast to the organic filter membranes which are known from the prior art, which have been used to date in small sewage treatment plants, a filtration appliance having a ceramic-based membrane may therefore be used without problems also in moving-bed methods, in particular also in small sewage treatment plants operated according to the WSB® method. It withstands without problems the biological action caused by the microorganisms and at the same time reliably separates these off. Fine solids and suspended matter can if appropriate also be reliably separated off. At the same time, it is resistant to mechanical action, for example due to plastic carrier particles floating in the activation tank. This becomes particularly positively noticeable with respect to maintenance intervals and lifetime of the membrane.

In a preferred aspect, the membrane plate has a coating. This preferably comprises at least one separation layer which consists at least in part, in some preferred aspects, essentially completely, of nanoscale particles. Preferably, the separation layer has a fraction of nanoscale particles of at least 5% by weight, particularly preferably of at least 25% by weight, in particular of at least 40% by weight.

Nanoscale particles are taken to mean in the context of this application particles having a median particle size of less than 1 µm, preferably less than 500 nm, in particular less than 100 nm, particularly preferably less than 50 nm. These size figures relate to values which were obtained by means of light-scattering experiments.

The membrane plate coating mentioned may consist exclusively of the at least one separation layer. In a particularly preferred aspect, the coating, however, further comprises at least one further porous layer which is arranged between the membrane plate and the at least one separation layer. The at least one separation layer is preferably the outer layer at which the microorganisms are essentially separated off.

The coating situated on the membrane plate preferably has a thickness between about 100 nm and about 150 µm, preferably between about 500 nm and about 100 µm, in particular from approximately about 25 µm to about 60 µm. These values preferably also apply to the cases in which the coating consists of the at least one further porous layer and the at least one separation layer.

The thickness of the at least one separation layer is preferably in the range between about 100 nm and about 75 µm, in particular in the range between about 5 µm and about 50 µm, in particular approximately about 25 µm.

The thickness of the at least one further porous layer is preferably in the range between about 100 nm and about 75 µm, in particular in the range between about 5 µm and about 50 µm, in particular approximately about 25 µm.

The porous ceramic of the membrane plate (substrate) has pores preferably having a diameter between about 100 nm and about 10 µm, particularly preferably between about 500 nm and about 6 µm, in particular between about 500 nm and about 3 µm.

The at least one further porous layer has pores preferably having a diameter between about 500 nm and about 2 µm, particularly preferably between about 500 nm and about 1 µm, in particular between about 600 nm and about 900 nm.

In the case of a membrane plate provided with at least one separation layer, in particular the pore size of the at least one separation layer is very important for separating off the microorganisms. Preferably, a separation layer has pores having a diameter between about 1 nm and about 1400 nm, more preferably between about 50 nm and about 500 nm, in particular between about 50 nm and about 300 nm, particularly preferably between about 200 nm and about 300 nm.

The pore size of possibly underlying layers generally does not directly affect the separation of the microorganisms. However, it is preferred that underlying layers have larger pores than the separation layer. Particularly preferably, with respect to the pore size, there is a gradient to the outer separation layer. For instance, it is preferred that the pore sizes decrease towards the outside.

In preferred structures having at least one further porous layer between the at least one separation layer and the membrane plate, the size of the pores of the at least one further porous layer is between the size of the pores of the separation layer (smallest pore sizes) and the size of the pores of the membrane plate (which has the largest pores). This applies in particular to the mean values of pore sizes within the layers (since the pore size is frequently non-uniform within a layer, if appropriate overlapping with respect to the absolute pore sizes can occur, such that, for example, the size of the largest pores of the at least one separation layer can exceed the size of the smallest pores of the at least one further porous layer).

The porous ceramic of the membrane plate is preferably a ceramic based on a metal oxide, in particular based on aluminum oxide. In addition to oxidic ceramics such as aluminum oxide ceramics, in further preferred aspects, non-oxidic ceramics can also be used.

The nanoparticles of the separation layer are preferably oxidic nanoparticles, in particular aluminum oxide particles. In addition, in particular, also nanoparticles of zirconium dioxide or titanium dioxide or else mixtures of said oxidic nanoparticles can be preferred. For particularly thin separation layers, in particular zeolites are very highly suitable. In further preferred embodiments, the nanoparticles can also be non-oxidic nanoparticles.

In a particularly preferred structure of the filtration appliance, the membrane plate has internally at least one channel for the outflow of purified wastewater. Preference is given to a plurality of channels which are preferably arranged in parallel to one another which extend uniformly over the interior of the membrane plate.

A filtration appliance has preferably at least 2 membrane plates. Depending on the individual case, the number of membrane plates can vary greatly. For instance, for purifying relatively small amounts of wastewater, filtration appliances having 3 to 15, in particular 3-10, membrane plates can be preferred. If larger amounts of wastewater are produced, however, filtration appliances having several hundred membrane plates are also conceivable.

A filtration appliance has preferably a modular structure which enables the number of membrane plates to be varied in accordance with the respective requirements.

In a particularly preferred embodiment of the filtration appliance, the at least 2 membrane plates are arranged essentially in parallel to one another. In this case it is further preferred that the distance between a plurality of membrane plates which are arranged essentially in parallel to one another is essentially always the same.

As has already been described, the shape of a membrane plate in a filtration appliance can in principle be selected freely, depending on the individual case. The same applies in principle also to the dimensions of a membrane plate, wherein the length or width of a membrane plate generally does not exceed about 150 cm. For instance, in a preferred embodiment, a rectangular membrane plate has a length of approximately 50 cm and a width of approximately 11 cm.

The thickness of a membrane plate in a filtration appliance is here generally preferably in the range between about 0.15 mm and about 20 mm, in particular between about 0.5 mm and about 10 mm. In a particularly preferred embodiment, a membrane plate has a thickness of approximately 6 mm.

As has already been mentioned, we also provide a method of purifying wastewater, in particular, in a sewage treatment plant. This is distinguished in that microorganisms situated in the wastewater are separated off by means of at least one ceramic-based membrane.

The method comprises a biological purification of the wastewater by microorganisms in at least one activation tank.

In addition, the method preferably comprises a secondary clarification of the wastewater in at least one secondary clarification tank.

It is preferred in this case that the at least one activation tank and/or the at least one secondary clarification tank is charged with shaped bodies for cleaning, which shaped bodies have a maximum space diagonal between about 0.1 cm and about 10 cm, preferably between about 0.5 cm and about 5 cm, in particular between about 0.5 cm and about 2 cm.

Particularly preferably, the microorganisms are separated off from the wastewater using a sewage treatment plant, wherein further preference is given to separation using a filtration appliance having membrane plates arranged parallel to one another, the distance between one another of which corresponds to at least the maximum space diagonal of the shaped bodies, preferably exceeds this by at least about 5%, particularly preferably by at least about 25%, in particular by at least about 100%.

The filtration appliance and also the shaped bodies have already been described extensively above, for which reason, at this point also, the corresponding positions of the description are explicitly incorporated hereby by reference.

Not only the membrane plate, but also the coating comprising the separation layer have been described in the context of the explanations of the filtration appliance. Here also, correspondingly, reference is made to the relevant parts of the description.

Example 1

A study was made of how the distance between adjacent membrane plates of an inventive filtration appliance for suitable shaped bodies (K1 Biofilm Carrier Elements from Kaldness, 3103 Tønsberg, Norway, see FIG. 1) may be adjusted optimally. As has already been mentioned, here in particular 2 factors play a part, in principle an attempt is made to set the distance between the membrane plates as low as possible in order to keep the filtration appliance as compact as possible. However, in this case the shaped bodies must not ever become stuck between the membrane plates, since otherwise the motion of the shaped bodies on the membrane surface and therefore the mechanical covering-layer abrasion is inhibited.

Figure 2:
FIG. 2: shows shaped bodies stuck between membrane plates

If the spacing is too small, the motion of the shaped bodies between two membrane plates, as a result of their size and shape (the maximum space diagonal of the K1 shaped bodies is between 7.0 mm and 13.5 mm) would lead to the shaped bodies being jammed between the plate walls and also among one another, which can easily be seen in FIG. 2.

Not until a spacing of 30 mm±0.5 mm was jamming no longer observed, even after operation for one week. At this distance, in addition, optimum values for the flow rate and filtration performance of the membrane plates were measured.

Figure 3:
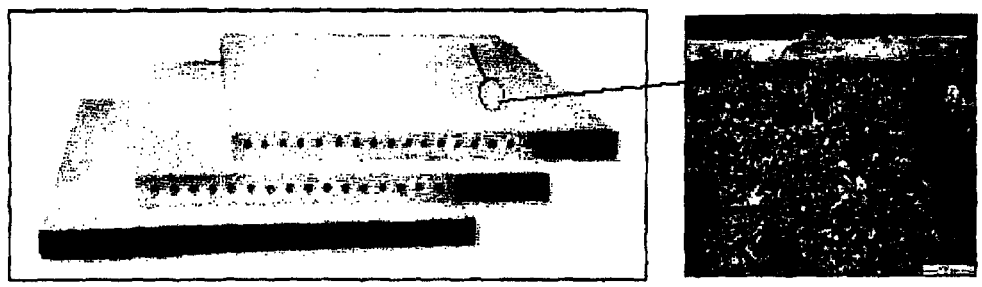
FIG. 3: shows, on the left: membrane plates having channels for conducting away purified water; on the right: microscopic detail of a cross section through one of the membrane plates

The membrane plates of aluminum oxide used are shown in FIG. 3. In the left-hand picture, in each case the outlets of a plurality of channels in the membranes may be seen. The channels serve for the outflow of the purified wastewater. In the right-hand picture, a microscopic section of a cross section through one of the membrane plates is shown. In the lower region (dark), the relatively coarse-grain structure of the porous ceramic of the membrane plate may be seen. At the top (light), the significantly finer structure of a thin coating may be seen on the porous ceramic.

Example 2

On a membrane plate, by applying a thin iron hydroxide film, a covering layer of microorganisms was simulated. The membrane plate was subsequently used over a time period of 62 hours in an activation tank of a test unit which was charged with shaped bodies (K1 Biofilm Carrier Elements from Kaldness, 3103 Tønsberg, Norway; see FIG. 1). After this time period the iron hydroxide layer was detached from the membrane plate essentially completely by abrasion. A comparative experiment without shaped bodies resulted, in contrast, in no detachment of the simulated covering layer.

Example 3

Figure 4:
FIG. 4: shows membranes from the conventional filtration operation (without shaped bodies, cleaned only by aeration)

Membranes from conventional filtration operations (without shaped bodies, only cleaned with aeration, see FIG. 4)

were used after four months of filtration in activation sludge for tests for covering-layer detachment. The tests were each carried out repeatedly with membranes having different pore sizes (200 nm and 300 nm).

For this, the membranes which were coated with a thin, slimy-feeling covering layer of microorganisms were introduced into a test unit operated according to the WSB® method which test unit was charged with shaped bodies (K1 Biofilm Carrier Elements from Kaldness, 3103 Tønsberg, Norway; see FIG. 1). In operation, the surfaces of the membranes were exposed to continuous impacts by the shaped bodies. After 66 hours, the membranes were taken out again and studied. The slimy-feeling covering layer had completely disappeared.

During operation in the test unit, the permeability of the membranes was measured continuously. Not only for membranes having 200 nm pore size, but also for those having a pore size of 300 nm, starting from an initial value, a continuous increase in permeability was measured. After approximately 48 hours, the permeability achieved a maximum value in both cases and remained subsequently constant. For the membranes having 200 nm pore size, from the increase in permeability this gave a performance increase of approximately 61%, for membranes having 200 nm pore size, a performance increase of just under 80% was observed.

Figure 5:
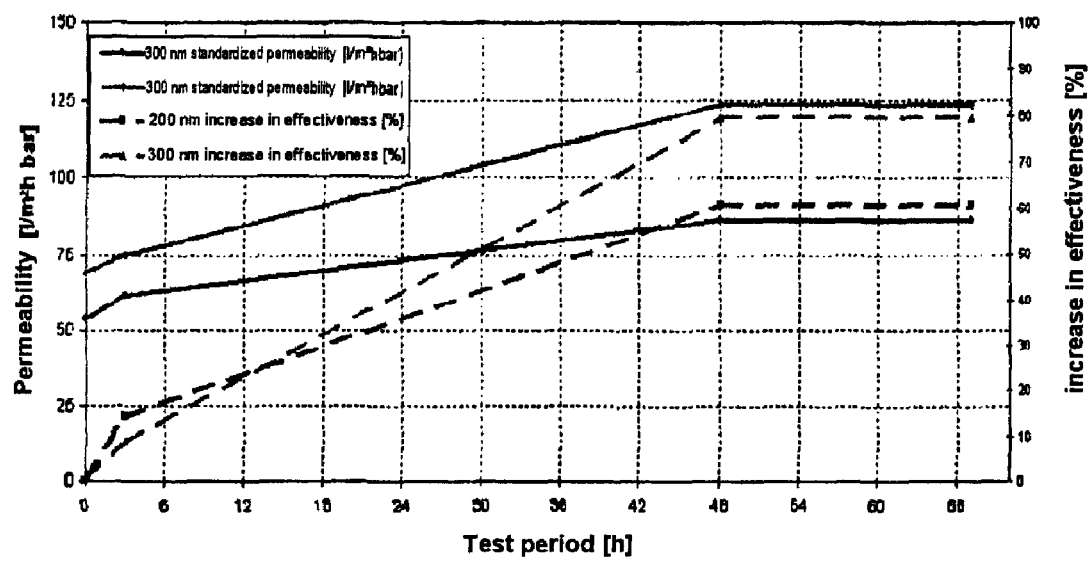
FIG. 5: shows diagram to illustrate the abrasive effect which is caused by shaped bodies impacting a membrane from the conventional filtration operation (according to FIG. 4).
Figure 6:
FIG. 6: shows an SEM image of a section through a membrane plate. Three layers may be seen, namely on the left the separation layer, in the center a further porous layer and on the right a membrane plate made of a porous ceramic. The layers and the membrane plate itself each consist of aluminum oxide. The separation layer and the further porous layer each have a thickness of approximately 25 µm. The thickness of the membrane plate is by contrast from 1.8 mm to 3.25 mm. The pore size decreases toward the separation layer from 4000 to 6000 nm (membrane plate) through approximately 800 nm (central further porous layer) to approximately 200 nm (separation layer).

The results of the measurements are shown in FIG. 5. In the diagram, the permeability [l/m$^2$·h·bar] and the performance increase [%] are plotted against the experimental time [h]. The upper continuous line (light) describes the permeability change of the membrane having 300 nm pore size. The lower continuous line (dark) similarly indicates the permeability change of the membrane having 200 nm pore size. The dashed lines in each case indicate the course of the performance increase for the different membranes.

The invention claimed is:

1. A sewage treatment plant comprising:
   at least one activation tank for wastewater and/or at least one secondary clarification tank for wastewater, the activation tank and/or the secondary clarification tank being charged with shaped bodies freely suspended in the wastewater, and
   at least one filtration appliance for wastewater purification comprising membrane plates arranged essentially in parallel to one another, wherein the membrane plates are made of a porous ceramic and have a thickness between 0.15 mm and 20 mm, wherein
   the shaped bodies are plastic shaped bodies and have a space diagonal of between 0.1 cm and 10 cm,
   the membrane plates arranged essentially in parallel to one another are submerged at least in part in the at least one activation tank and/or in the at least one secondary clarification tank such that a surface of at least two membrane plates can immediately contact the shaped bodies floating in the tanks, and
   the membrane plates comprise at least one separation layer which consists at least in part of nanoscale particles and which has pores having a diameter between 1 nm and 1400 nm.

2. The sewage treatment plant as claimed in claim 1, wherein the shaped bodies in the activation tank are carriers for microorganisms.

3. The sewage treatment plant as claimed in claim 1, the shaped bodies in the secondary clarification tank are substantially not carriers for microorganisms.

4. The sewage treatment plant as claimed in claim 3, wherein the shaped bodies in the secondary clarification tank have biocidal properties.

5. The sewage treatment plant as claimed in claim 1, further comprising at least one filtration appliance having membrane plates arranged parallel to one another.

6. The sewage treatment plant as claimed in claim 5, wherein the distance between adjacent membrane plates corresponds to at least a maximum space diagonal of the shaped bodies.

7. The sewage treatment plant as claimed in claim 5, wherein the distance between adjacent membrane plates exceeds a maximum space diagonal of the shaped bodies by at least about 5%.

8. The sewage treatment plant as claimed in claim 5, wherein the distance between adjacent membrane plates exceeds a maximum space diagonal of the shaped bodies by at least about 25%.

9. The sewage treatment plant as claimed in claim 1, wherein the coating comprises at least one further porous layer arranged between the membrane plate and the separation layer.

10. The sewage treatment plant as claimed in claim 1, wherein the coating has a thickness between about 100 nm and about 150 µm.

11. The sewage treatment plant as claimed in claim 1, wherein the porous ceramic of the membrane plate has pores having a diameter between about 100 nm and about 10 µm.

12. The sewage treatment plant as claimed in claim 1, wherein the porous ceramic of the membrane plate has pores having a diameter between about 500 nm and about 3 µm.

13. The sewage treatment plant as claimed in claim 1, wherein the separation layer has pores having a diameter between about 50 nm and about 300 nm.

14. The sewage treatment plant as claimed in claim 1, wherein the separation layer has pores having a diameter between about 200 nm and about 300 nm.

15. The sewage treatment plant as claimed in claim 1, wherein the porous ceramic of the membrane plate is an oxidic ceramic.

16. The sewage treatment plant as claimed in claim 1, wherein the nanoparticles of the separation layer are oxidic nanoparticles.

17. The sewage treatment plant as claimed in claim 1, wherein the nanoparticles of the separation layer are selected from the group consisting of aluminum oxide, zirconium dioxide, titanium dioxide and mixtures thereof.

18. The sewage treatment plant as claimed in claim 1, wherein the membrane plate comprises at least one internal channel for the outflow of purified wastewater.

19. The sewage treatment plant as claimed in claim 1, having at least 2 membrane plates.

20. The sewage treatment plant as claimed in claim 19, wherein the at least two membrane plates are arranged essentially parallel to one another.

21. The sewage treatment plant as claimed in claim 20, wherein the distance between a plurality of membrane plates which are arranged essentially parallel to one another is substantially the same.

22. A method of purifying wastewater, comprising biologically purifying the wastewater with microorganisms in the at least one activation tank and/or secondarily clarifying the wastewater in the at least one clarification tank according to the sewage treatment plant of claim 1, wherein the at least one activation tank and/or the at least one secondary clarification tank, for cleaning, is charged with shaped bodies such that microorganisms situated in the wastewater are separated by at least one ceramic-based membrane.

23. The method as claimed in claim 22, wherein the shaped bodies have a maximum space diagonal between about 0.1 cm and about 10 cm.

24. The method as claimed in claim 22, wherein the shaped bodies have a maximum space diagonal between about 0.5 cm and about 5 cm.

25. The method as claimed in claim 22, wherein the microorganisms are separated from the wastewater by at least one sewage treatment plant.

26. The method as claimed in claim 22, wherein the microorganisms are separated by a filtration appliance having membrane plates arranged parallel to one another, wherein the distance between adjacent membrane plates corresponds to at least a maximum space diagonal of the shaped bodies.

27. The method as claimed in claim 22, wherein the microorganisms are separated by a filtration appliance having membrane plates arranged parallel to one another, wherein the distance between adjacent membrane plates exceeds a maximum space diagonal of the shaped bodies by at least about 5%.

* * * * *